H. W. VAN LEIR.
BOTTLE CAPPING MACHINE.
APPLICATION FILED SEPT. 13, 1913.
1,183,781.
Patented May 16, 1916.
6 SHEETS—SHEET 1.
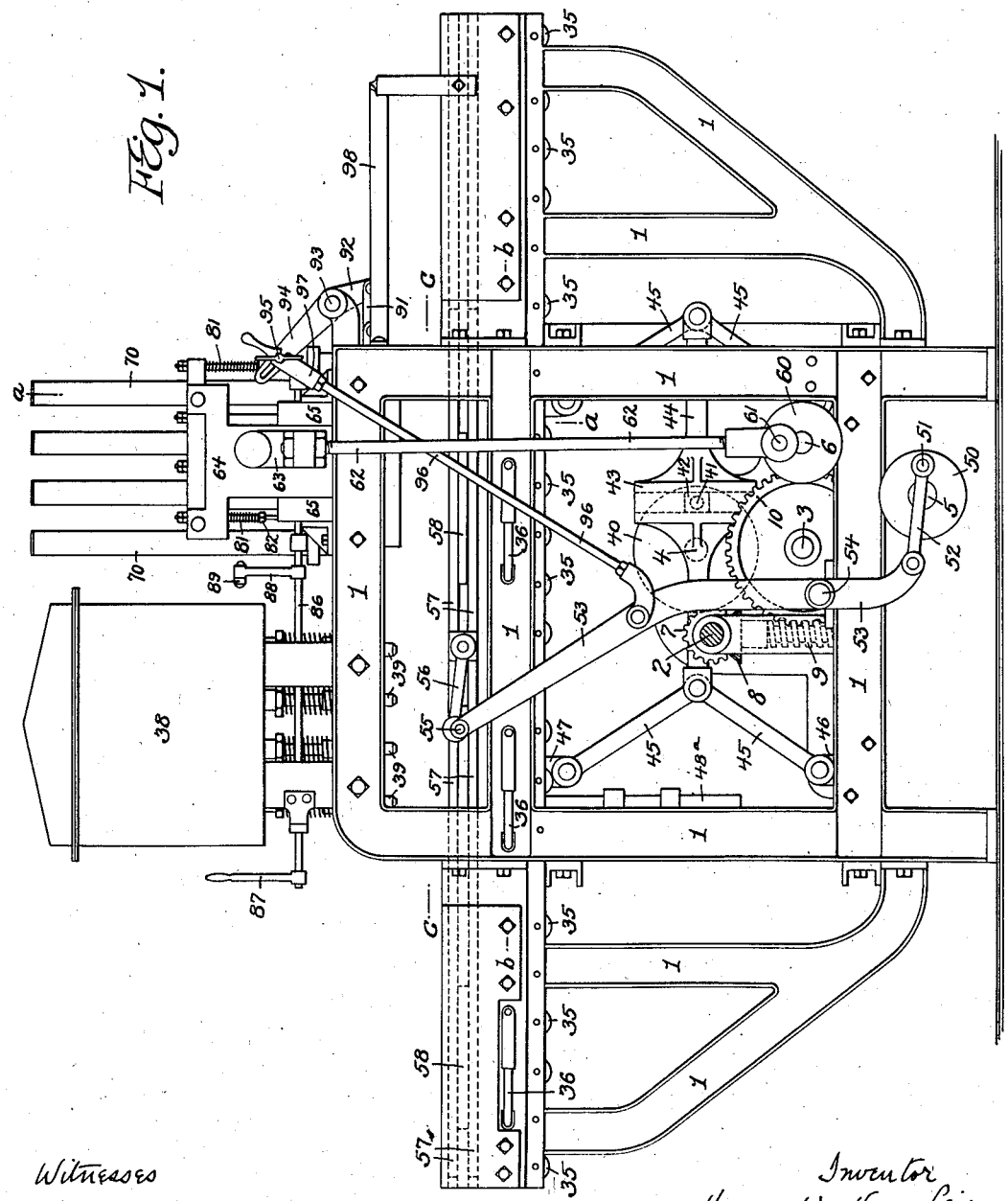

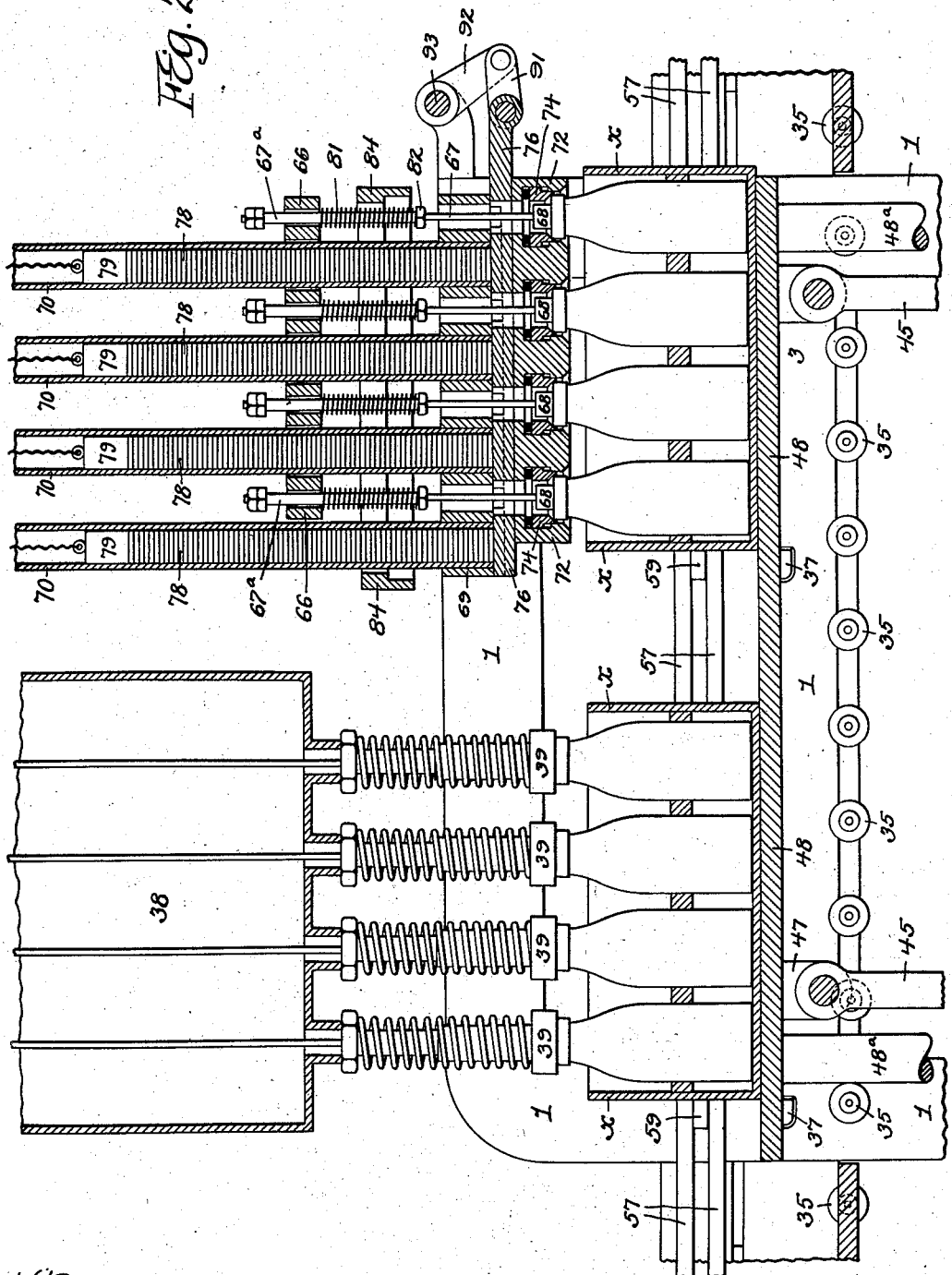

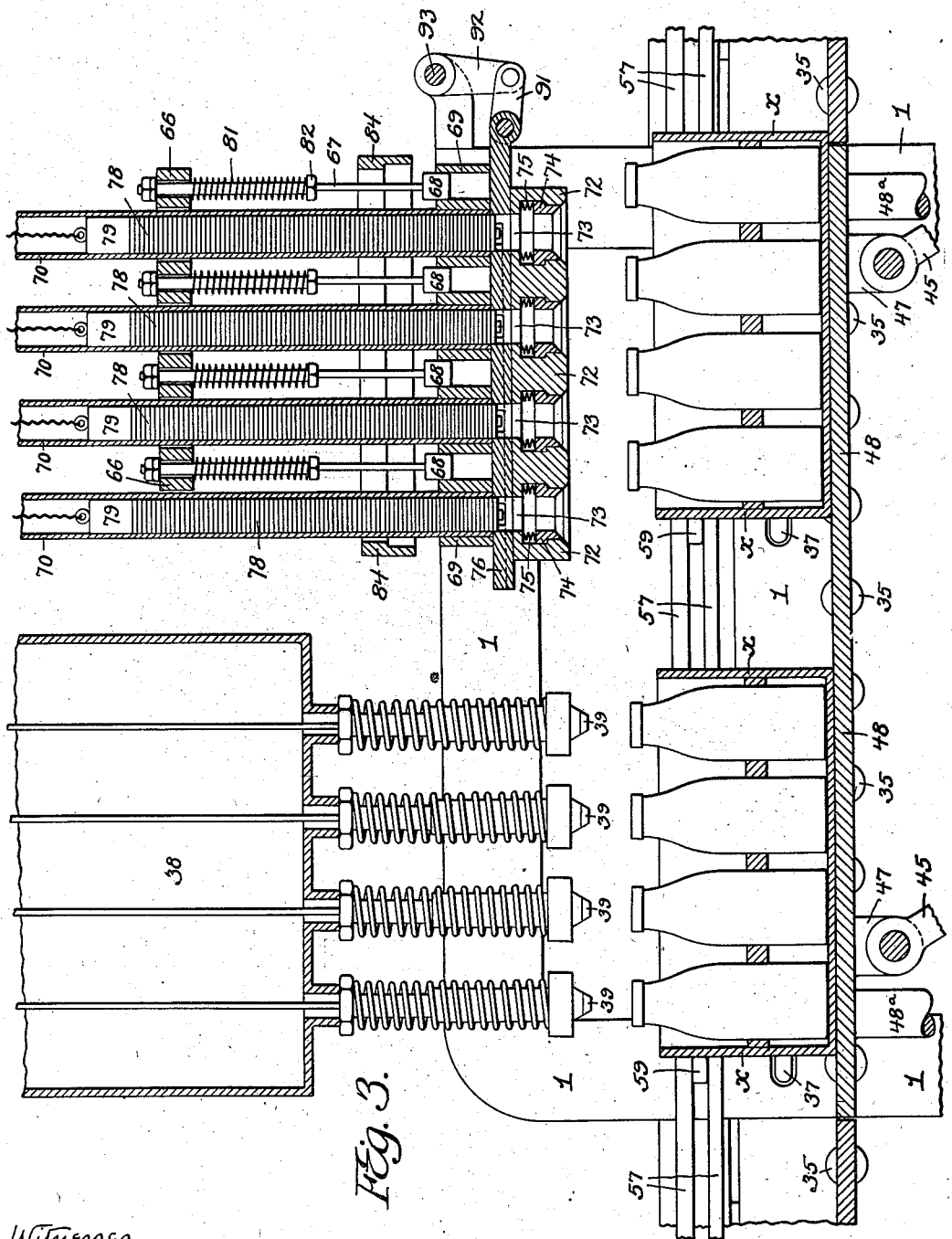

H. W. VAN LEIR.
BOTTLE CAPPING MACHINE.
APPLICATION FILED SEPT. 13, 1913.
1,183,781.
Patented May 16, 1916.
6 SHEETS—SHEET 4.
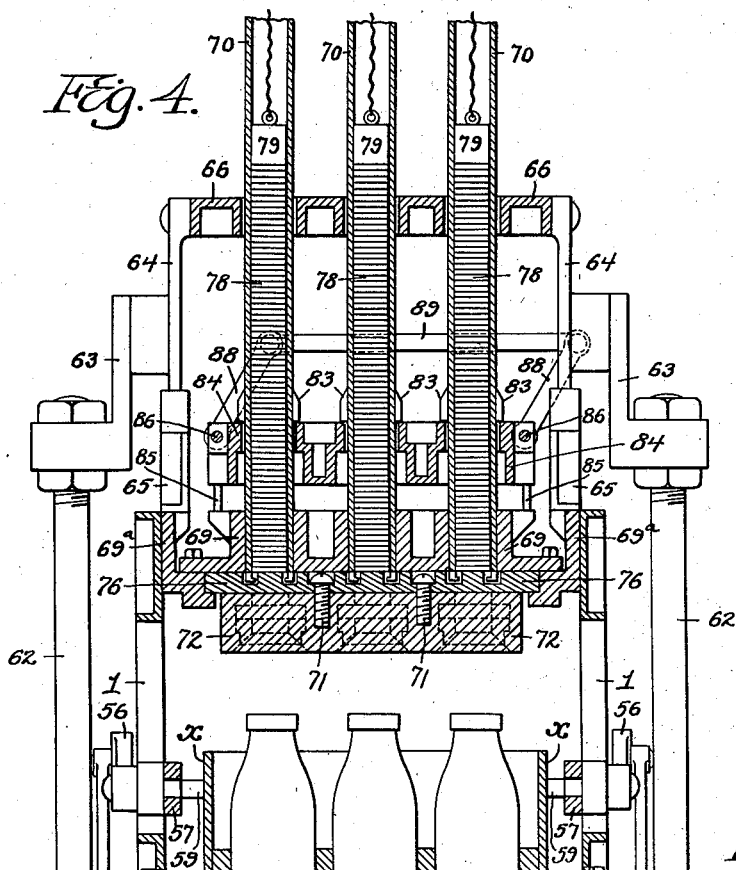
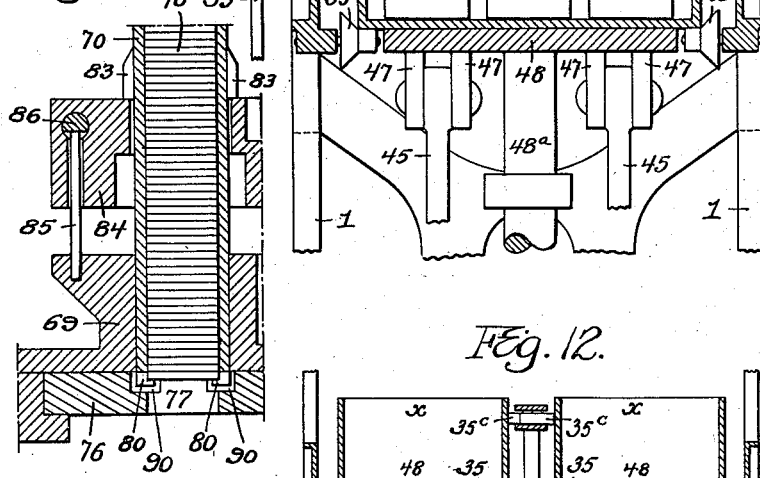
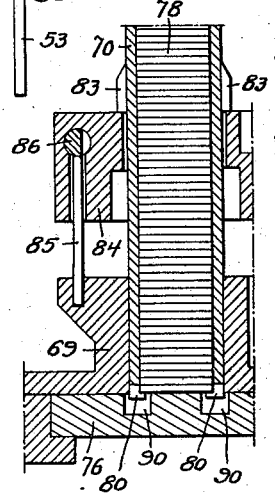
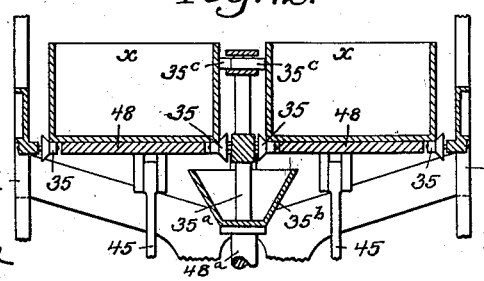

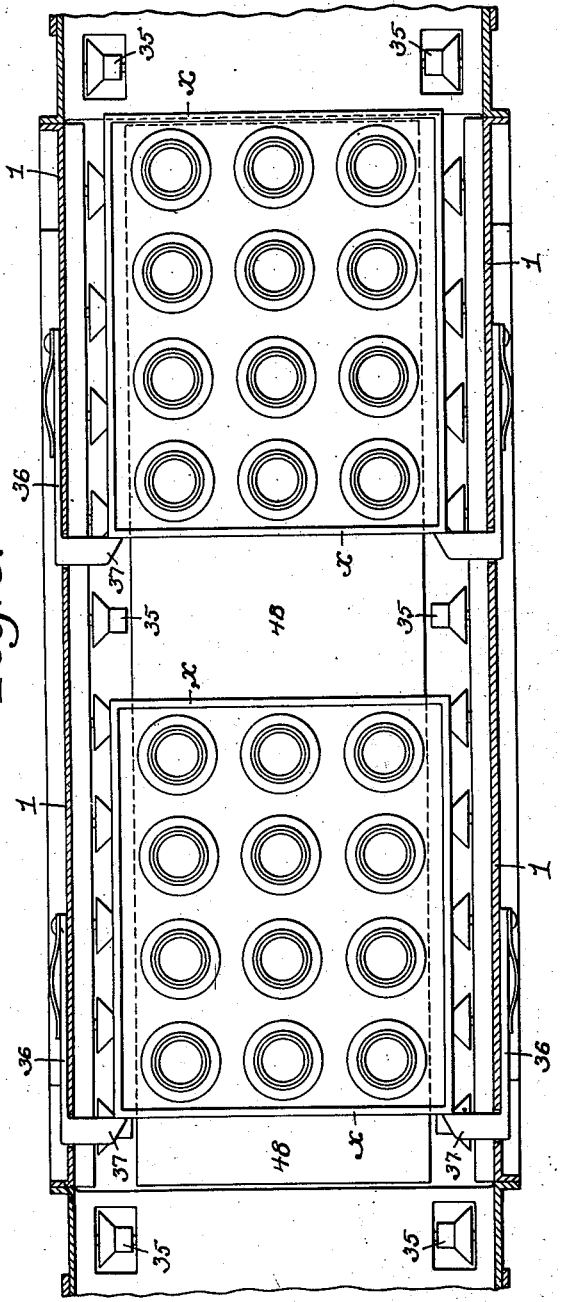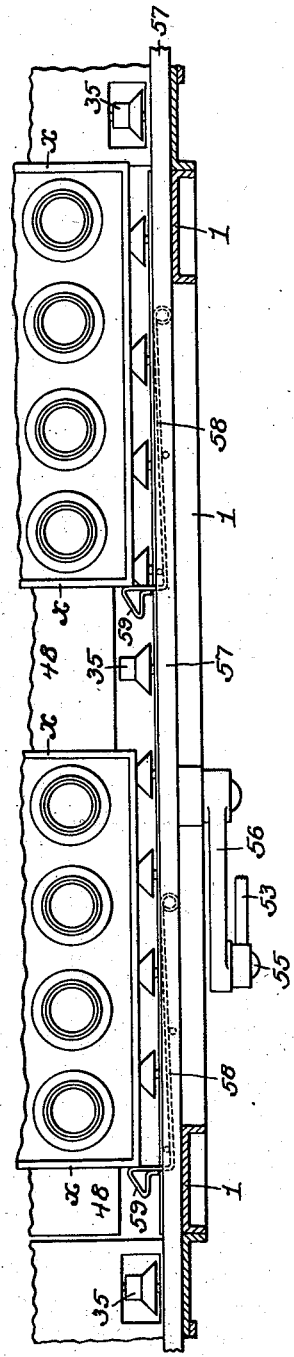

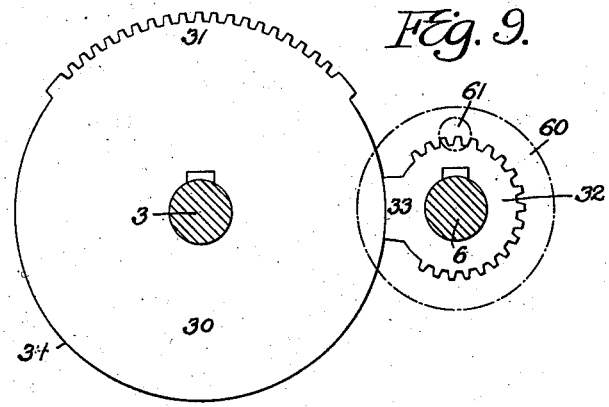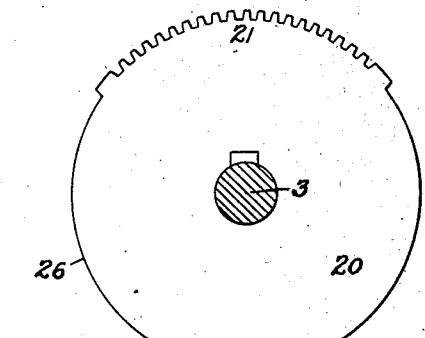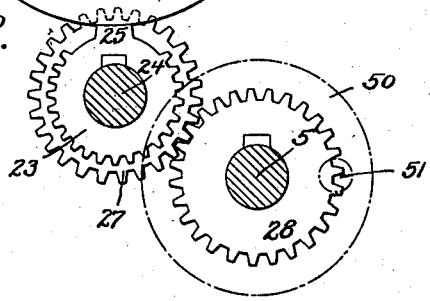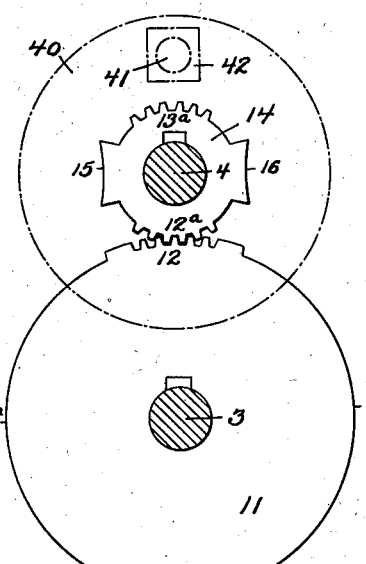

UNITED STATES PATENT OFFICE.

HENRY W. VAN LEIR, OF PHILADELPHIA, PENNSYLVANIA, ASSIGNOR TO S. S. WENZELL MACHINE COMPANY, OF PHILADELPHIA, PENNSYLVANIA, A CORPORATION OF WEST VIRGINIA.

BOTTLE-CAPPING MACHINE.

1,183,781.   Specification of Letters Patent.   Patented May 16, 1916.

Application filed September 13, 1913. Serial No. 789,623.

*To all whom it may concern:*

Be it known that I, HENRY W. VAN LEIR, a citizen of the United States, residing in Philadelphia, Pennsylvania, have invented certain Improvements in Bottle-Capping Machines, of which the following is a specification.

The object of my invention is to so construct a bottle capping machine as to insure certainty in the feeding of the bottle crates and in the capping of the bottles, to lock the bottle and cap feeding devices in position between their successive operations, and to readily arrest the feeding of the caps when desired. This object I attain in the manner hereinafter described, reference being had to the accompanying drawings, in which—

Figure 1 is a side elevation of a bottle filling and capping machine having capping mechanism constructed in accordance with my invention; Fig. 2 is a view, partly in longitudinal section and partly in elevation, of part of the machine; Fig. 3 is a similar view showing some of the parts in a different position from that represented in Fig. 2; Fig. 4 is a transverse section on the line *a—a*, Fig. 1; Fig. 5 is a view, partly in plan and partly in horizontal section, on the line *b—b*, Fig. 1; Fig. 6 is a view, partly in plan and partly in horizontal section, on the line *c—c*, Fig. 1; Figs. 7, 8 and 9 are vertical sectional views illustrating certain gearing employed in connection with the operation of different parts of the machine; Figs. 10 and 11 are sections in different positions of parts of the cap feeding mechanism, and Fig. 12 is a transverse section illustrating a construction adopted when the machine is duplex in character. Figs. 2 to 9, inclusive, are on a larger scale than Fig. 1, and Figs. 10 and 11 on a still larger scale.

In Fig. 1 of the drawing, 1 represents one of the fixed side frames of the machine, and 2, 3, 4, 5 and 6 a series of transverse shafts geared together as hereinafter described and serving to impart movements to the various operative members of the machine, the mechanism operated by the shaft 4 serving to effect the raising and lowering of the bottle crates, the mechanism operated by the shaft 5 serving to feed the crates forward intermittently through the machine, and also to aid in the operation of the capping devices, and the mechanism operated by the shaft 6 serving to complete the application of the caps to the filled bottles.

The shaft 2 is the one to which power is applied, and this shaft is geared by bevel wheels 7 and 8 to a vertical worm shaft 9 which meshes with a worm 10 on the shaft 3, the latter, through the medium of gearing shown in Figs. 7, 8 and 9, serving to transmit intermittent movements to the shafts 4, 5 and 6 and to lock said shafts in position between such movements.

As shown in Fig. 7, the shaft 3 has secured to it a disk 11 with two toothed segments 12 and 13 on its periphery, these toothed segments meshing respectively with similar toothed segments 12$^a$ and 13$^a$ on the periphery of a disk 14 which is secured to the shaft 4, said disk 14 also having between the segments 12$^a$ and 13$^a$ two concave segments 15 and 16. The shaft 3 rotates continuously but imparts intermittent movements of partial rotation to the shaft 4, and in the intervals between these movements the concave segment 15 or 16 bears upon the corresponding convex segment 15$^a$ or 16$^a$ of the disk 11 and serves to lock said shaft 4 in position. As shown in Fig. 8 the shaft 3 is also provided with a disk 20 having a toothed segment 21 thereon, which meshes with the toothed periphery of a disk 23 secured to a shaft 24 so as to rotate the latter, a tooth of the disk 23 being larger than the others and having a concave periphery 25 which, in the intervals between the intermittent rotations of the shaft 24 engages with the convex periphery 26 of the disk 20 and locks said shaft 24 in position. The shaft 24 has secured to it a spur wheel 27 which meshes with a similar spur wheel 28 on the shaft 5 and serves to transmit to the latter, the intermittent rotations of the shaft 24. As shown in Fig. 9, the shaft 3 is also provided with a disk 30 having a toothed segment 31 which meshes with the teeth of a disk 32 secured to the shaft 6 so as to impart intermittent movements of full rotation to said shaft, one of the teeth 33 of the disk 32 being larger than the others and having a concave periphery which, during the intervals between the intermittent movements of the shaft 6, engages the convex surface 34 of the disk 30 and serves to lock said shaft 6 in position.

The shaft 4 has at each end a disk 40 with projecting crank pin 41, the latter carrying a pivoted block 42 which engages a slotted cross head 43 on a frame 44, (Fig. 1) whereby, as such shaft 4 is intermittently rotated each frame 44 is moved first in one direction and then in the opposite direction. To each end of each frame 44 is pivoted a pair of links 45, one of which is pivoted to a fixed bearing 46 on a cross member between the side frames 1, the other link being pivoted to lugs 47 on the under side of a table 48, (Fig. 4) to which rising and falling movements are therefore imparted as the frames 44 are reciprocated, there being a dwell both when the table is in the elevated position and when it is in the depressed position, owing to the fact that the disk 40 is only rotated to the extent of a half turn at each movement so as to carry the crank pin 41 from one extreme of its throw to the other, the disk 40 being locked between successive movements.

The shaft 5 has at each end a disk 50 with crank pin 51, the latter being connected by a link 52 to the lower arm of a lever 53 which is pivotally mounted at 54 to a suitable support on the fixed frame, and shown in Fig. 1 the upper arm of the lever 53 being connected by means of an eccentrically located pivot 55 to one end of a link 56 whose other end is pivoted to a projecting boss on a slide 57, said slide being suitably guided longitudinally on the fixed frame and being provided with spring hooks 58 having beveled heads 59 projecting inwardly beyond the slide and adapted to engage with the bottle carrying crates $x$ during the forward movement of the slide, as shown in Fig. 6. During the backward movement of the slide the beveled heads 59 of the hooks will strike the forward edges of the following crates and the hooks will be laterally deflected until they reach the rear ends of said following crates, whereupon they will be projected so as to engage said rear ends. During the forward movement of the bottle crates they rest upon rollers 35 (Figs. 5 and 6) free to turn upon suitable pins which, in the case of a machine dealing with a single row of crates, project inwardly from the side frames of the machine.

In the case of a duplex machine dealing with a double row of crates, such for instance as shown in Fig. 12, the table 48 has central openings for the reception of central pairs of rollers 35, rotatably mounted in brackets 35$^a$ which project upwardly from the base of a drip tray 35$^b$, the latter being supported upon and extending longitudinally between the guides by the central depending stems 48$^a$ at the ends of the table 48, upward extensions of the brackets 35$^a$ supporting a longitudinal frame which carries a staggered row of rollers 35$^c$ that contact with the inner sides of the crates, holding them more firmly in proper alinement.

During the backward movement of the slide 57 and its hooks 58 the crates are prevented from moving rearwardly by engagement with spring-actuated hooks 36 mounted upon the side frames 1 and having inwardly projecting and rearwardly beveled heads 37, so that as a crate $x$ is pushed forwardly past said heads they will spring outwardly until the crate has passed them and will then spring inwardly again so as to engage the back of the crate, as shown in Fig. 5. The rollers 35 have tapered flanges which serve to keep the crates within proper lateral limits, or to restore said crates to proper lateral position should they develop any tendency to leave it.

There are three pairs of hooks 36 mounted upon the fixed side frames of the machine, one hook on each of the left hand, intermediate and right hand pairs of these hooks being shown in Fig. 1, and there are a corresponding number of pairs of hooks 58 carried by the longitudinally reciprocating frame 57, as also shown in Fig. 1. The rising and falling table 48 is of sufficient length to accommodate two bottle crates separated from one another to an extent equal to the separation of the bottle filling and capping devices of the machine, and in feeding the machine a crate of empty bottles is first pushed forwardly over the rollers 35 until it is in position to be engaged by the heads of the first or left hand pairs of hooks 36 and 58, supposing that the frame 57 is then at the rear or left hand end of its reciprocating movement. On the first forward or right hand movement of the frame 57, therefore, the crate of empty bottles will be moved forwardly into position beneath the filling devices and onto the table 48, and will there be engaged by the heads of the intermediate pair of hooks 36 so as to be prevented from moving backwardly with the frame 57 on the next rearward movement of the latter. When such rearward movement is completed the crate of filled bottles will be engaged by the heads of the intermediate pair of hooks 58, and on the next forward movement of said frame 57 will be carried forwardly into position beneath the capping devices, and will there be engaged by the heads of the forward or right hand pair of hooks 36, to be retained as before. On the next backward movement of the frame 57 the crate of filled and capped bottles will be engaged by the heads of the forward or right hand pair of hooks 58, and on the next forward movement of said frame 57 will be carried forwardly from the table 48 and deposited upon the rollers 35 at the delivery or right hand end of the machine.

By reason of the eccentricity of the pivot 55 whereby the end of the link 56 is connected to the upper arm of the lever 53, turning of said eccentrically pivoted end of the link in one direction or the other on the pivot 55 will, because of such eccentricity of the pivot, provide for a limited amount of forward or backward adjustment of the slide 57 in respect to said lever, so that the termination of the forward movement of a bottle crate can be regulated with exactitude in order to insure the proper registry of the bottles in the crates with the filling and capping devices.

The particular construction of the bottle filling devices constitutes no part of my present invention, and any ordinary form of valved filling device which opens on the rise of the bottle, as shown in Fig. 2, and closes on the descent of the bottle, as shown in Fig. 3, may be employed. In the present instance I have shown the filling tank at 38 in Figs. 2 and 3, and the vertically movable spring-depressed and valved filling nozzles at 39.

The shaft 6 has at each end a disk 60 with crank pin 61 which engages the lower end of a rod 62, the upper end of the latter being secured to a swinging arm 63 pivotally mounted upon a slide 64, the latter being vertically movable in guides 65 on the fixed frame and carrying a cross head 66 (Fig. 4) from which are suspended a series of stems 67, each carrying a plunger 68 (Fig. 3) adapted to a vertical opening in a frame 69 which extends transversely between a supporting frame 69ª mounted upon the opposite side frames, as shown in Fig. 4, and is secured thereto so as to occupy a fixed vertical position. When the disks 40, 50 and 60 are in the position of rest their crank pins always occupy a dead-center position thus providing a precautionary means in addition to the locking of the shafts 4, 5 and 6, to prevent accidental movement of either of these disks from its position at rest by means of force applied through the devices to which the crank pins impart motion.

Vertically guided in suitable openings in the frame 69 are the lower portions of cap reservoirs 70, of which there are as many as there are bottles in a crate, said cap reservoirs being mounted as hereinafter described so as to be raised and lowered in respect to said frame 69.

Guided in the supporting frame 69ª, as shown in Fig. 4, so as to be free to reciprocate longitudinally, is a cap feeding plate 76 having therein as many cap receiving openings as there are cap reservoirs 70, said cap receiving openings being so disposed in the plate 76 as to register with their respective cap reservoirs when the said feeding plate 76 is in position to receive the caps from said reservoirs. Secured to the cap feeding plate 76, as for instance by means of screws 71 (Fig. 4) is a depending capping head 72 in which are openings 73 in line with the cap receiving openings of the feeding plate 76, each of said openings 73 being enlarged and chambered in its lower portion for the reception, guidance and support of a flanged ring 74, which, when the bottles are raised beneath the capping head, strikes the flange around the mouth of the bottle and serves to center said mouth during the capping operation. The rings 74 are normally held in their proper position by means of springs 75 so that said rings can yield vertically in order to accommodate themselves to inequalities in the height of the bottles.

When the feed slide occupies its rearward position a cap receiving opening is in line vertically with each of the cap reservoirs, as shown in Fig. 3, while, when the feed slide is in its forward position, each of the openings therein is in line vertically with one of the plunger containing openings in the frame 69, above the said slide and also with a bottle contained in a crate which is in position beneath the capping devices, as shown in Fig. 2.

Each of the cap reservoirs contains a stack of caps 78, which may descend in the reservoir by their own weight, or such descent may be assisted by means of a weight 79 applied to the top of the stack, as shown in Figs. 2, 3 and 4. The descent of the stack is arrested by contact of the lowermost cap with hooked lugs 80, these lugs being located one at each side of the reservoir and projecting sufficiently below the reservoir to support the lowermost cap below the bottom of the same, said cap then occupying a position in the upper portion of the corresponding opening 77 of the feed slide 76, as shown in Fig. 10. When, therefore, the feed slide is drawn forward it carries with it the lowermost cap of the stack in each of the reservoirs 70, and moves said cap into line with a plunger 68 in the frame 69, so that when said plunger descends it will, as shown in Fig. 2, drive the cap out of the opening in the feed slide 76 through the opening 73 in the capping head 72 and into the recessed mouth of the bottle, finally depositing the cap upon the cap seat at the base of said recess. When this has been accomplished the plunger is free to yield upwardly supposing that there is any further downward movement of the cross head 66 which carries the plunger, for the plunger stem is not secured rigidly to the cross head but is acted upon by a spring 81 interposed between the underside of said cross head and a nut or collar 82 on the plunger spindle 67, as shown in Figs. 2 and 3. In order to prevent engagement of the spring 81 with the threads of the plunger spindle, the latter is surrounded by a tubular sleeve 67ª, as also shown in Figs. 2 and 3.

Each of the cap receptacles 70 is mounted by means of projecting lugs 83 upon a cross head 84 which is free to move vertically to a limited extent upon supporting and guiding pins 85 projecting upwardly from the frame 69, as shown in Fig. 4. At its upper end each of the pins 85 contacts with a shaft 86 mounted in the cross head 84 so as to be free to turn therein, as shown in Figs. 10 and 11, this shaft extending beyond the cross head 84, as shown in Fig. 1, and being provided at one end with a handle 87 whereby it may be conveniently rocked to the extent of a quarter turn so as to cause either a flat face of the shaft 86 to bear upon the upper ends of the pins 85, as shown in Fig. 10, or so as to cause the curved face of the shaft to bear upon the upper ends of said pins, as shown in Fig. 11. A shaft 86 is located at each side of the cross head 84, and the two shafts are connected by means of arms 88 and a link 89, as shown in Fig. 4, so as to move in unison. When the shafts are in the position shown in Fig. 10 the cross head 84 is permitted to drop so as to lower the cap reservoir 70 and permit the lowermost cap to enter the opening 77 in the cap feeding slide 73 and thereby permit of the removal of a cap from each reservoir on each reciprocation of said slide, but when the shafts 86 are adjusted to the position shown in Fig. 11 the cross head 84 and its cap reservoir 70 are raised so as to carry the lowermost cap of the stack out of the opening 77 in the feed slide 76 and thus arrest the removal of the caps from the reservoirs until the shafts 86 are again manipulated so as to lower said reservoirs. By this means the delivery of caps to the cap feeding slide 76 can be readily arrested whenever there are no bottles to receive the caps, and this can be done without arresting the operation of the other parts of the machine.

In order that the cap supporting lugs 80 may not interfere with the free reciprocating movement of the feed slide 76 when the cap reservoirs are in their lowered position, as shown in Fig. 10, said cap slide has formed in it longitudinal grooves 90, as shown in Figs. 10 and 11. Reciprocating movement is imparted to the cap feeding slide 76 from the lever 53 by means of the devices shown in Figs. 1, 2 and 3, on reference to which it will be noted that to one end of said slide 76 is pivoted a link 91, which is also pivoted to an arm 92 on a rock shaft 93 adapted to bearings in brackets projecting from the frame 69, said rock shaft also having another arm 94 which is slotted for the reception of a bolt 95 whereby said arm can be connected to the upper end of a rod 96 whose lower end is pivotally connected to the lever 53.

Adjustment of the bolt 95 in the slot of the arm 94 provides for variation in the adjustment of the throw of the feed slide 76, and provision for instantly arresting the movement of said slide when desired is afforded by a notched head 97 at the upper end of the rod 96, which notched head can be readily moved into or out of engagement with the bolt 95 in order to place the feed slide 76 into or out of operative relation with the actuating lever 53.

At each side of the machine at the delivery end of the same is an elevated rail 98, these rails serving for the support of the cap feeding slide 76 and capping head 72, when, as is sometimes the case, said parts have to be disconnected from the mechanism which normally coöperates therewith.

It is preferable to rotate the main shaft 2 of the machine by frictional driving mechanism so as to permit of the stoppage of the operating parts of the machine when any member of the same meets with a resistance which it cannot overcome, thereby preventing the breakages which would otherwise result.

I claim:

1. The combination, in a bottle capping machine, of intermittently operating devices for forcing caps into the mouths of bottles, a crate feeding slide, a lever for actuating the same, and a link connecting said lever and slide, said link having at one end an eccentrically pivoted connection whereby movement of the link on said eccentric pivot will cause adjustment of the slide from and toward the lever.

2. The combination, in a bottle capping machine, of a frame having cap reservoirs, a reciprocating cap feeding slide having cap receiving openings and opposite longitudinal grooves extending from one cap receiving opening to another, and cap supporting lugs carried by the cap reservoirs and projecting into said longitudinal grooves of the feed slide so as to permit the lowermost caps of the stack to enter the openings therein.

3. The combination, in a bottle capping machine, of cap reservoirs, means for supporting the caps therein with the lowermost cap projecting beyond the bottom of the reservoir, a cap feeding slide, and means for raising and lowering said cap reservoirs so as to carry the lowermost cap into or out of range of the cap feeding slide.

4. The combination, in a bottle capping machine, of a series of cap reservoirs, each provided with means for supporting a stack of caps so that the lowermost cap will project beyond the bottom of the reservoir, a reciprocating cap feeding slide, a support for the series of reservoirs, and means for raising and lowering said support so as to simultaneously raise and lower the cap reservoirs and move the lowermost caps therein out of or into position for engaging the feeding slide.

5. The combination, in a bottle capping machine, of a fixed frame, having upwardly projecting pins, a vertically adjustable support carrying a series of cap reservoirs and having cammed shafts resting upon said pins, and means for rocking said shafts so as to raise and lower the support which carries the cap reservoirs.

6. The combination, in a bottle capping machine, of a fixed frame having upwardly projecting pins, a vertically adjustable support carrying a series of cap reservoirs, two pin-supported shafts mounted in said adjustable support so as to rock therein, each of said shafts having a cammed face, means for imparting movement directly to one of said shafts, and means for transmitting said movement to the other shaft.

7. The combination, in a bottle handling machine, of a support over which the bottle crates can be fed in succession, a vertically movable table for raising and lowering said crates in the intervals between their forward movements, longitudinally separated pairs of toggles for supporting said table, a frame connecting said toggles, said frame having a slotted cross head, a crank having a pin for engaging said slot, and means for imparting intermittent movements of partial rotation to said crank.

In testimony whereof, I have signed my name to this specification, in the presence of two subscribing witnesses.

HENRY W. VAN LEIR.

Witnesses:
 THOS. J. LOUDERBACK,
 B. H. HARTLEY.